L. G. ADAMS.
DRIVING MECHANISM.
APPLICATION FILED JULY 29, 1916.
1,265,583.
Patented May 7, 1918.
3 SHEETS—SHEET 1.
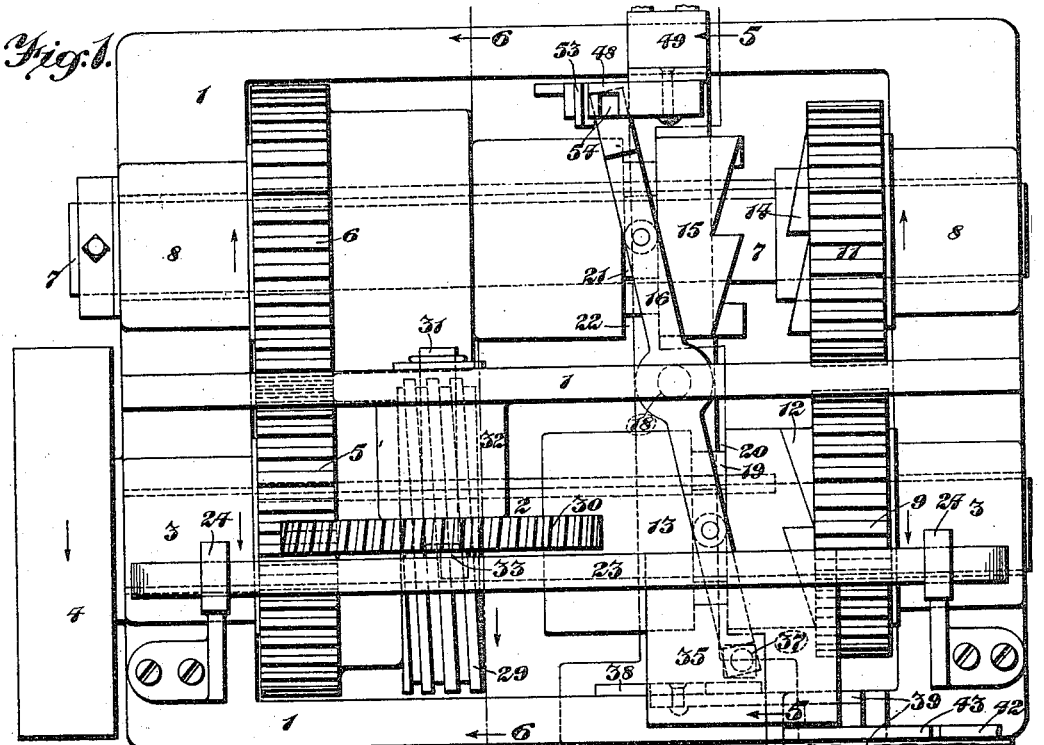
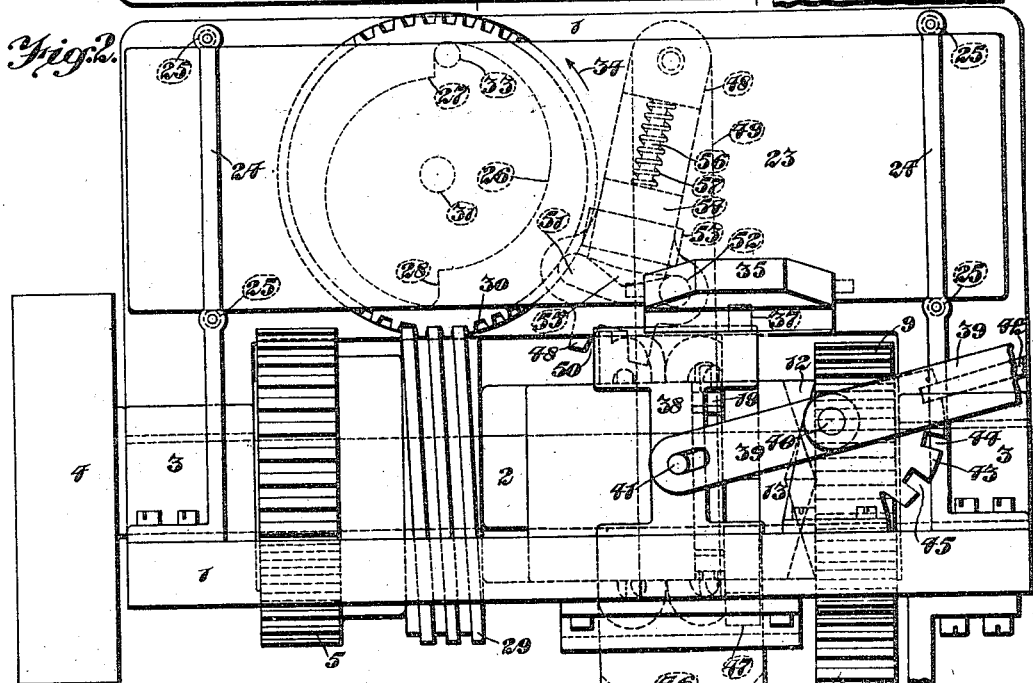
Attest:
Charles A. Becker.
Inventor
Leon G. Adams
His Attorneys

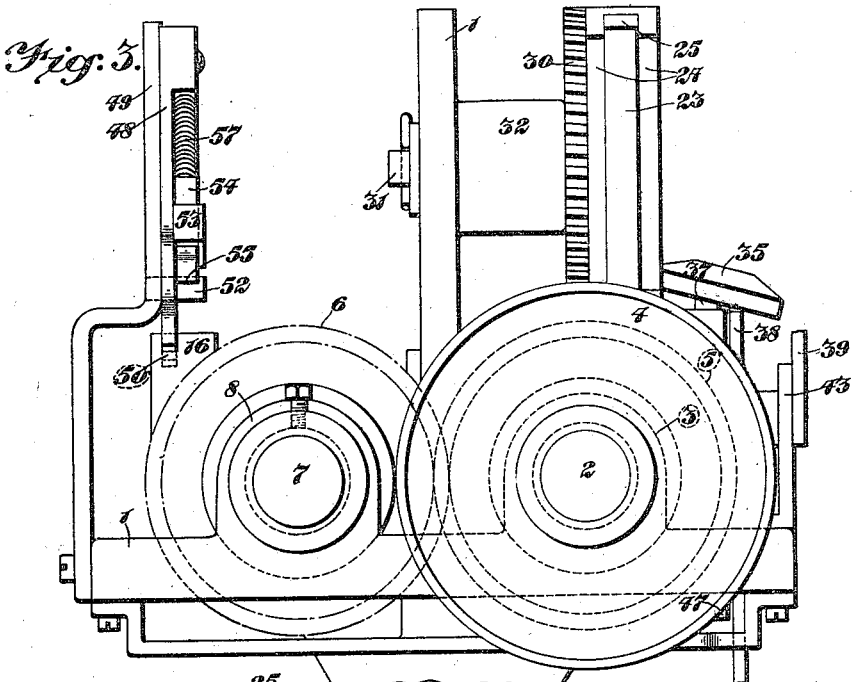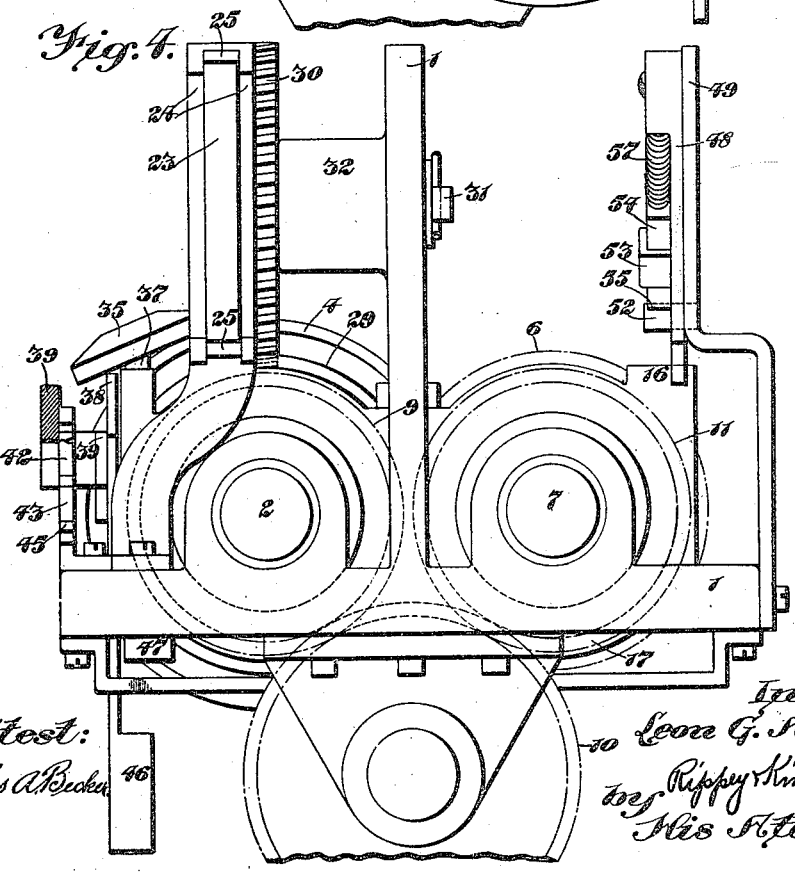

L. G. ADAMS.
DRIVING MECHANISM.
APPLICATION FILED JULY 29, 1916.
1,265,583.
Patented May 7, 1918.
3 SHEETS—SHEET 3.
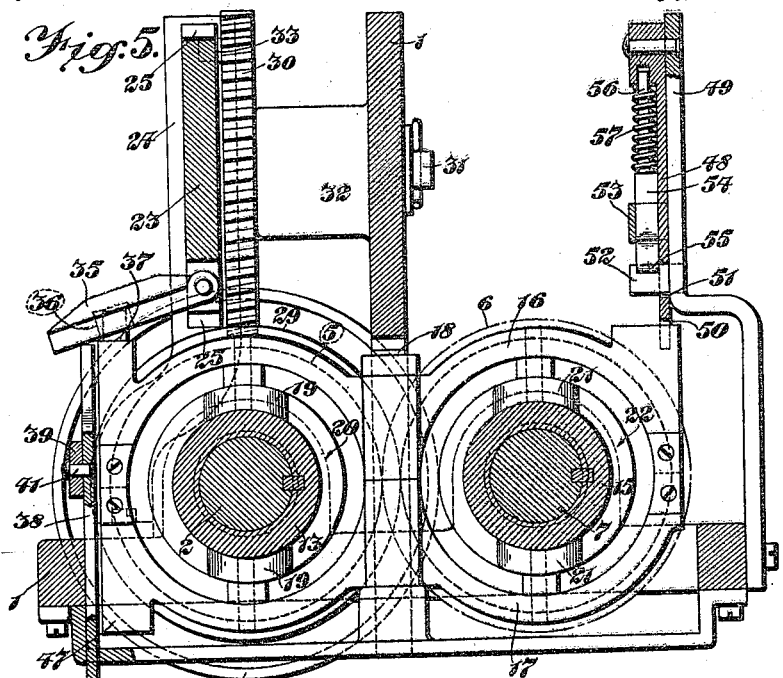
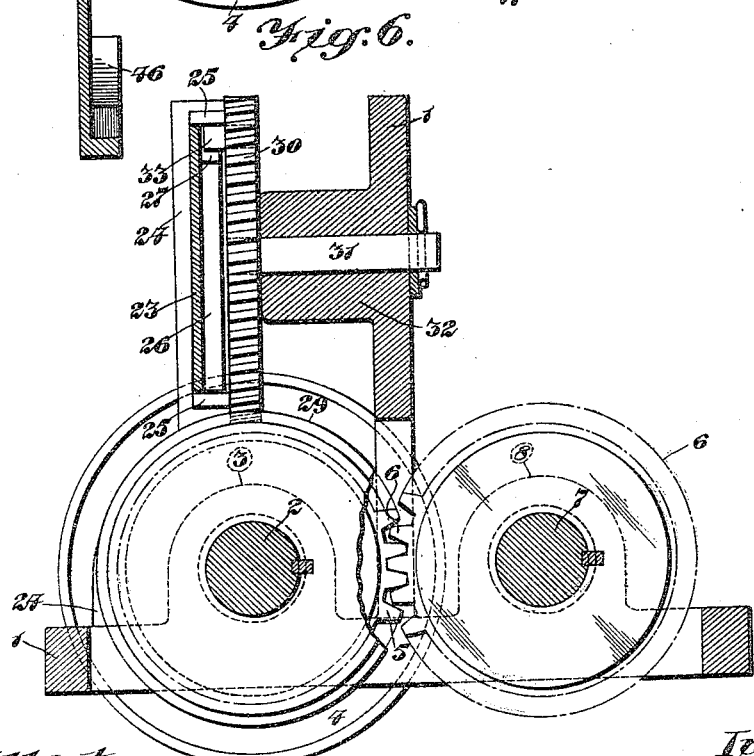
Attest:
Charles A. Becker
Inventor.
Leon G. Adams,
by Rippey & Kingsland
His Attorneys

UNITED STATES PATENT OFFICE.

LEON G. ADAMS, OF ST. LOUIS, MISSOURI.

DRIVING MECHANISM.

1,265,583.  Specification of Letters Patent.  Patented May 7, 1918.

Application filed July 29, 1916. Serial No. 111,937.

*To all whom it may concern:*

Be it known that I, LEON G. ADAMS, a citizen of the United States, residing at the city of St. Louis and State of Missouri, have invented a new and useful Driving Mechanism, of which the following is a specification.

This invention relates to reversible driving mechanisms adapted for use for driving any machine or driven mechanism, such for instance as laundry machines, though it will be understood that its use is not restricted to that purpose.

The object of the invention is to provide a driving mechanism for driving any machine or driven device continuously in one direction, or alternately in opposite directions at the option of the operator, the reverse being effected automatically by means driven by the driving mechanism.

Other objects will appear from the following description, reference being made to the accompanying drawing, in which I have illustrated a preferred embodiment of the invention, and in which—

Figure 1 is a plan view of my improved driving mechanism.

Fig. 2 is a side elevation.

Fig. 3 is an end elevation, a part of the gearing being shown diagrammatically.

Fig. 4 is a view of the opposite end of the gearing from that illustrated in Fig. 3, the gear wheels in this view being shown diagrammatically.

Fig. 5 is a cross sectional view on the line 5—5 of Fig. 1.

Fig. 6 is a cross sectional view on the line 6—6 of Fig. 1.

The entire driving mechanism in the embodiment in which I have illustrated my invention is supported by a base 1 adapted to be mounted in any fixed position in relation to the driven mechanism. The drive mechanism includes a drive shaft 2 journaled in bearings 3 and provided with a pulley 4 whereby the drive shaft may be driven from a motor or engine. A gear wheel 5 is attached to the drive shaft and meshes with a similar gear wheel 6 which is attached to a shaft 7, the latter being journaled in bearings 8 upon the base 1. The shaft 7 is parallel with the shaft 2 and is maintained in constant rotation by the gear wheels 5 and 6 when the shaft 2 is in operation.

A pinion 9 is loose upon the drive shaft 2 and is in constant mesh with a gear 10 in and constituting a part of the driven mechanism. By this arrangement the gear 10, which may be referred to as the driven mechanism, will be operated by the pinion 9 when the latter is clutched or made fast upon the shaft 2, but when the pinion 9 is loose upon the shaft 2 the driven mechanism 10 will not be operated by said pinion 9. A pinion 11, similar to the pinion 9, is loose upon the shaft 7 and is also in constant mesh with the gear 10 so that said gear 10 will be operated by the pinion 11 when the latter is clutched or made fast upon the shaft 7, but when the pinion 11 is loose upon the shaft 7 the driven mechanism 10 will not be operated by the pinion 11. Thus, the driven mechanism may be operated by the pinion 9 or the pinion 11 and, since the pinion 11 rotates in a reverse direction from the pinion 9, it will be understood that the driven mechanism will also be operated by the pinion 11 in a reverse direction from that in which said driven mechanism is operated by the pinion 9.

As first suggested in this specification, my improved driving mechanism is specially adapted for use in operating washing machines and other mechanisms where it is desired to operate the driven mechanism, that is to say, the mangle or washing mechanism of a washing machine alternately in reverse directions. For effecting this reverse operation, my improved driving mechanism is equipped with clutch devices for alternately clutching the pinions 11 upon their respective shafts, so that the gear 10 is alternately driven by the pinions 9 and 11 and is therefore alternately operated in opposite directions.

The clutch mechanism for the pinion 9 includes a clutch member 12 rigid with said pinion and a sliding clutch member 13 keyed to slide upon the shaft 2 and to engage with the clutch member 12 in order to clutch or make fast the pinion 9 upon the drive shaft 2. The clutch mechanism for the pinion 11 includes a clutch member 14 rigid with said pinion and a coöperating clutch member 15 keyed to slide upon the shaft 7 and arranged to engage with the clutch member 14 to clutch or make fast the pinion 11 upon the shaft 7. A connecting actuating lever is provided which engages both of the sliding clutch members 13 and 15 and is operative to move said clutch members alternately into and out of engagement with their cooperating clutch members, or to retain both of said clutch members 13 and 15 out of engagement with their coöperating clutch members to permit the driven mechanism to remain idle or stationary while the driving mechanism is in operation. The clutch shift lever mentioned comprises an upper portion 16 and a lower portion 17, both pivoted upon an axis 18 midway between the shafts 2 and 7. The two members 16 and 17 of the clutch shift lever, as will be understood by reference to Fig. 5, are in the form of yokes which embrace the clutch members 13 and 15. The shift lever thus formed is pivotally connected to blocks or shoes 19 seated in an annular groove 20 in the clutch member 13, so that by oscillation of the clutch lever the clutch member 13 may be moved into and out of engagement with the clutch member 12. The lever is also pivotally connected to blocks or shoes 21 seated in an annular groove 22 in the clutch member 15, so that the clutch members 13 and 15 are moved in opposite directions alternately into and out of engagement with their coöperative clutch members by operation of the clutch shift lever.

Movement of the clutch shift lever for the purposes mentioned is automatically effected by mechanism driven by the drive shaft. Said mechanism includes a reciprocating plate 23 operating in guides 24 preferably between rollers 25 arranged above and below the plate. Said plate is provided with a recess 26 on one side having a shoulder 27 at the upper portion thereof and a shoulder 28 at the lower portion thereof. A worm gear 29 is rigid upon the drive shaft 2 and meshes with a gear 30 supported by an axial member 31 journaled in bearings in a support 32 carried by the base 1. A lug 33 on the gear 30 extends into the recess 26 and alternately engages the shoulders 27 and 28 and thereby shifts the plate 23 in opposite directions. This will be understood by reference to Fig. 2, the gear 30 revolving in the direction of the arrow 34, and the lug 33 being in engagement with the shoulder 27. The parts, being in the positions shown, the plate 23 will be moved by the lug 33 until said lug traveling in the arc of a circle passes below the shoulder 27 into the larger portion of the recess 26, thus leaving the plate 23 stationary while the gear 30 continues to revolve. The lug 33 is thereafter engaged with the shoulder 28 and the plate 23 is thereby actuated in the opposite direction, this reverse movement of the plate 23 being continuous while the driving mechanism is in operation.

The connection between the plate 23 and the clutch shift lever includes a pivoted element 35 carried by the plate 23 and having a recess 36 which receives a projection 37 on one end of the clutch shift lever. Thus, the clutch shift lever is oscillated by the plate 23 and the clutch members 13 and 15 are moved alternately into and out of engagement with their coöperating clutch members.

On some occasions it may be desired to operate the driven mechanism continuously in one direction and this is effected by preventing operation of the clutch members 13 and 15, leaving either of said clutch members in clutching engagement with its coöperating member. In order to prevent operation of the clutch shift lever, I provide means for disconnecting the member 35 from the projection 37. The means last mentioned includes a sliding support 38 and a lever 39 for operating the same. The lever 39 is pivoted at 40 and has pin-in-slot connection 41 with the support 38. Obviously, by operating the lever 39 to raise the support 38, the member 35 will be disengaged from the projection 37 and said member 35 will be carried back and forth without operating the clutch shift lever, thus leaving either of the clutch members 13 or 15 in clutching engagement. The lever 39 is provided with a ratchet member 42 arranged to coöperate with a notched segment 43 of usual construction in order to hold the lever 39 in any selected position. By placing the ratchet 42 in the notch 44 of the segment either clutch member may be left in engagement, but by depressing the lever 39 until the ratchet 42 engages in the notch 45, both clutches will be automatically disconnected. In order to effect disengagement of both clutches and to retain them disconnected, the support 38 is provided with two cam shoulders 46 arranged to engage an extension 47 (Fig. 5) on the lower part of the clutch shift lever and thereby move the clutch shift lever to a position in which both clutch members 13 and 15 are out of engagement with their coöperating clutch members.

In order to hold the clutch shift lever in its two positions for retaining either clutch member 13 or 15 in engagement, a special retaining device is provided. The retaining device includes a lever 48 pivoted upon a support 49 and having a notch 50 in its lower end embracing one end of the clutch shift lever. The lever 48 has an arcuate slot 51 through which a projection 52 extends. A bracket 53 is attached to the lever 48 and guides a latch device 54 having its lower end somewhat pointed, as indicated at 55, (Fig. 2), so that the oblique walls leading to the point operate against the projection 52. A projection 56 on the latch member 54 is encircled by a spring 57 which actuates the latch member downwardly and, by causing it to coöperate with the projection 52, is effective to hold the lever 48 in either of its two lateral positions and is thereby effective to hold the clutch shift lever in position to hold either of the clutch members 13 or 15 in or out of engagement.

It will be understood that the construction and combination of these parts may be varied without departure from the principles of the invention, and that I do not limit myself to unessential details.

What I claim and desire to secure by Letters Patent of the United States, is:—

1. Driving mechanism, comprising a drive shaft, an additional shaft, a gear rigid on the drive shaft, a gear rigid on the additional shaft and meshing with the gear on the drive shaft, a driven mechanism, a pinion loose on the drive shaft permanently engaging the driven mechanism, a pinion loose on the additional shaft permanently engaging the driven mechanism, clutch devices movable to different clutching positions wholly by the drive shaft independently of the driven mechanism aforesaid, for clutching said pinions alternately upon said shafts, and optional means for preventing movement of said clutch devices from any clutching position.

2. Driving mechanism, comprising a drive shaft, an additional shaft, means for driving the additional shaft from the drive shaft, a driven element, a pinion loose on the drive shaft and a pinion loose on the additional shaft, both permanently engaging said driven element, a clutch device for each of said pinions, mechanism driven wholly by said drive shaft independently of the driven element aforesaid, for shifting said clutch devices alternately into and out of clutching position as required to clutch said pinions alternately upon said shafts, and optional means for preventing shifting of said clutch devices out of any clutching position in which they may be placed.

3. Driving mechanism, comprising a drive shaft, an additional shaft driven by said drive shaft, a driven element, a pinion upon said drive shaft permanently engaging said driven element, a pinion upon said additional shaft permanently engaging said driven element, a clutch device for each of said pinions for clutching said pinions alternately upon their respective shafts, a lever engaging both of said clutch devices, a reciprocating member for oscillating said lever to shift said clutch devices into and out of operative position, devices driven wholly by said drive shaft independently of the driven element aforesaid, for actuating said reciprocating member, and optional means for preventing said reciprocating member from actuating said lever.

4. Driving mechanism comprising a drive shaft, an additional shaft driven by the drive shaft, pinions loosely mounted upon said shafts respectively, a mechanism driven by said pinions alternately, sliding clutch members upon said shafts respectively, a lever engaging said clutch members, a reciprocating member engaging said lever, a worm gear upon said drive shaft, a gear driven by said worm gear, means for actuating said reciprocating member by said last-named gear wholly independently of the driven mechanism aforesaid, whereby said clutch members are alternately engaged and disengaged as an incident to rotation of said drive shaft, and optional means for preventing said reciprocating member from actuating said lever.

5. Driving mechanism, comprising a drive shaft, an additional shaft driven by said drive shaft, pinions loosely mounted upon said shafts respectively, a mechanism arranged to be driven by said pinions alternately, sliding clutch members upon said shafts respectively, a lever engaging said clutch members, a sliding element engaging said lever for actuating the same to move said clutch members alternately into and out of operative position, a worm gear upon said drive shaft, a device driven by said worm gear wholly independently of the driven mechanism aforesaid, for moving said sliding element alternately in opposite directions to effect alternate engagement of said clutch members with their respective pinions, and optional means for preventing said element from moving said lever.

6. Driving mechanism comprising a drive shaft, a driven shaft operated thereby, pinions loosely mounted upon said shafts respectively, clutch members upon said shafts respectively for clutching said pinions to the shafts upon which they are mounted, a lever for shifting said clutch members into and out of engagement with said pinions, actuating mechanism driven by said drive shaft for oscillating said lever, means for disconnecting said actuating mechanism from said lever, and means for holding either of said clutch members in engagement with the corresponding pinion.

7. Driving mechanism comprising a drive shaft, an additional shaft driven thereby, a pinion loosely mounted upon each of said shafts, a clutch member upon each shaft, a lever for shifting said clutch members into and out of engagement with said pinions respectively, actuating mechanism driven by the drive shaft for operating said lever, means for disconnecting said actuating mechanism from said lever, and a latch device for holding either of said clutch devices in engagement with the corresponding pinion.

8. Driving mechanism comprising a drive shaft, a shaft driven by the drive shaft, pinions loosely mounted on said shafts respectively, a clutch member upon each of said shafts for locking said pinions alternately in connection with their shafts, a lever for shifting said clutch members alternately into and out of engagement with said pinions, a releasable element engaging said lever, an actuator for moving said element to operate said lever as required to shift said clutch members, a spring actuated latch device for holding said clutch members in engagement with said pinions, and an additional device for holding both of said clutch members disengaged from said pinions.

9. Driving mechanism comprising a drive shaft, an additional shaft driven thereby, a pinion loosely mounted upon each of said shafts, clutch mechanism for locking said pinions in connection with said shafts respectively, a lever controlling said clutch mechanism, a releasable element engaging said lever, a reciprocating member for actuating said releasable element, a gear for moving said reciprocating member, means for driving said gear from said drive shaft, and means for disengaging said releasable element from said lever.

10. Driving mechanism comprising a drive shaft, an additional shaft driven thereby, a pinion loosely mounted upon each of said shafts, clutch mechanism for locking said pinions in connection with said shafts respectively, a lever controlling said clutch mechanism, a releasable element engaging said lever, a reciprocating member for actuating said releasable element, a gear for moving said reciprocating member, means for driving said gear from said drive shaft, and means for disengaging said releasable element from said lever while either of said pinions is locked in connection with its shaft.

11. Driving mechanism comprising a drive shaft, an additional shaft driven by said drive shaft, a pinion loose upon each of said shafts, a clutch member upon each of said shafts for locking said pinions in connection with said shafts respectively, a lever for actuating said clutch members alternately into and out of engagement with said pinions respectively, a pivoted element engaging said lever, a reciprocating member for actuating said pivoted element to oscillate said lever, means driven by the drive shaft for actuating said reciprocating member, and means for disengaging said pivoted element from said lever while either of said clutch members is in engagement with its pinion.

12. Driving mechanism comprising a drive shaft, an additional shaft driven by the drive shaft, a pinion loosely mounted upon each of said shafts, clutch mechanism for locking said pinions alternately in engagement with said shafts respectively, a lever controlling said clutch mechanism, a pivoted element engaging said lever, a reciprocating member for actuating said pivoted element and thereby said lever, means driven by the drive shaft for moving said reciprocating member, and optional means for disengaging said pivoted element from said lever, whereby either of said pinions may be maintained in clutched engagement with its shaft at the option of the operator.

In witness whereof, I have signed this specification in the presence of two subscribing witnesses.

LEON G. ADAMS.

Witnesses:
N. G. BUTLER,
JOHN D. RIPPEY.

Copies of this patent may be obtained for five cents each, by addressing the "Commissioner of Patents, Washington, D. C."